(12) United States Patent
Heckmeier et al.

(10) Patent No.: US 7,105,209 B2
(45) Date of Patent: Sep. 12, 2006

(54) HOMEOTROPIC ALIGNMENT LAYER

(75) Inventors: Michael Heckmeier, Hemsbach (DE); Melanie Klasen-Memmer, Heuchelheim (DE); Georg Lüssem, Ober-Ramstadt (DE); Kazuaki Tarumi, Seeheim-Jugenheim (DE); David Coates, Wimborne (GB); Owain Llyr Parri, Poole (GB); Mark Verrall, Salisbury Wiltshire (GB); Mark John Goulding, Ringwood (GB); Stephen Christopher Kitson, South Gloucestershire (GB)

(73) Assignee: Merck KGaA, Darmstadt (DE)

( * ) Notice: Subject to any disclaimer, the term of this patent is extended or adjusted under 35 U.S.C. 154(b) by 225 days.

(21) Appl. No.: 10/432,682

(22) PCT Filed: Nov. 22, 2001

(86) PCT No.: PCT/EP01/13584

§ 371 (c)(1),
(2), (4) Date: Dec. 2, 2003

(87) PCT Pub. No.: WO02/44801

PCT Pub. Date: Jun. 6, 2002

(65) Prior Publication Data

US 2005/0179003 A1 Aug. 18, 2005

(30) Foreign Application Priority Data

Nov. 23, 2000 (EP) ................................ 00125235

(51) Int. Cl.
C09K 19/52 (2006.01)
G02F 1/1337 (2006.01)

(52) U.S. Cl. .......................... 428/1.1; 428/1.2; 428/1.3; 252/299.01; 349/127

(58) Field of Classification Search ................. 428/1.1, 428/1.2, 1.3; 252/299.01, 299.5; 349/123, 349/130, 131, 127

See application file for complete search history.

(56) References Cited

U.S. PATENT DOCUMENTS

| 4,469,408 A | 9/1984 | Krueger et al. |
| 5,863,457 A | 1/1999 | Haruyoshi et al. |
| 6,696,114 B1 | 2/2004 | Kawatsuki et al. |
| 6,816,218 B1 * | 11/2004 | Coates et al. ............... 349/123 |

FOREIGN PATENT DOCUMENTS

| EP | 0506175 | 9/1992 |
| GB | 2324382 | 10/1998 |
| JP | 2000212310 | 8/2000 |
| WO | WO 9800475 | 1/1998 |
| WO | WO 0046635 | 8/2000 |

OTHER PUBLICATIONS

Database wpi, section ch, week 200063, Derwent Publications Ltd., London, GB; AN 2000-649476, XP002200474.

* cited by examiner

*Primary Examiner*—Shean C. Wu
(74) *Attorney, Agent, or Firm*—Millen, White, Zelano & Branigan, P.C.

(57) ABSTRACT

The invention relates to an alignment layer comprising a polymerized liquid crystal material with homeotrophic orientation, to methods of its preparation, to polymerizable liquid crystal compositions and liquid crystal polymers used for the preparation of the alignment layer, to liquid crystal devices comprising the alignment layer, and to a method of controlling the electrooptical steepness of a liquid crystal display comprising at least one alignment layer by varying the surface anchoring energy of the alignment layer.

25 Claims, 4 Drawing Sheets

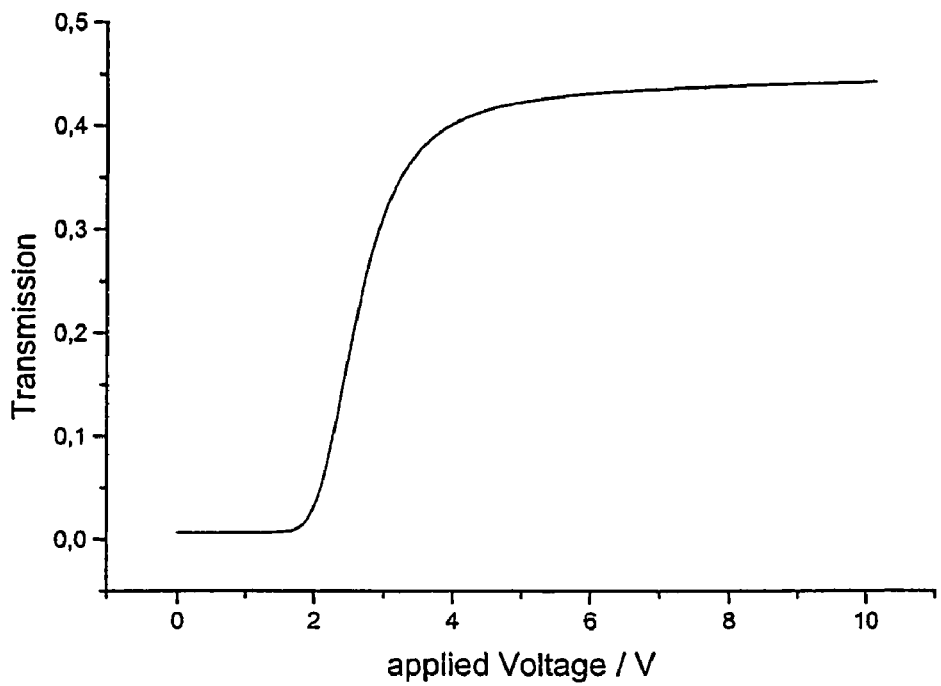
Figure 1.1
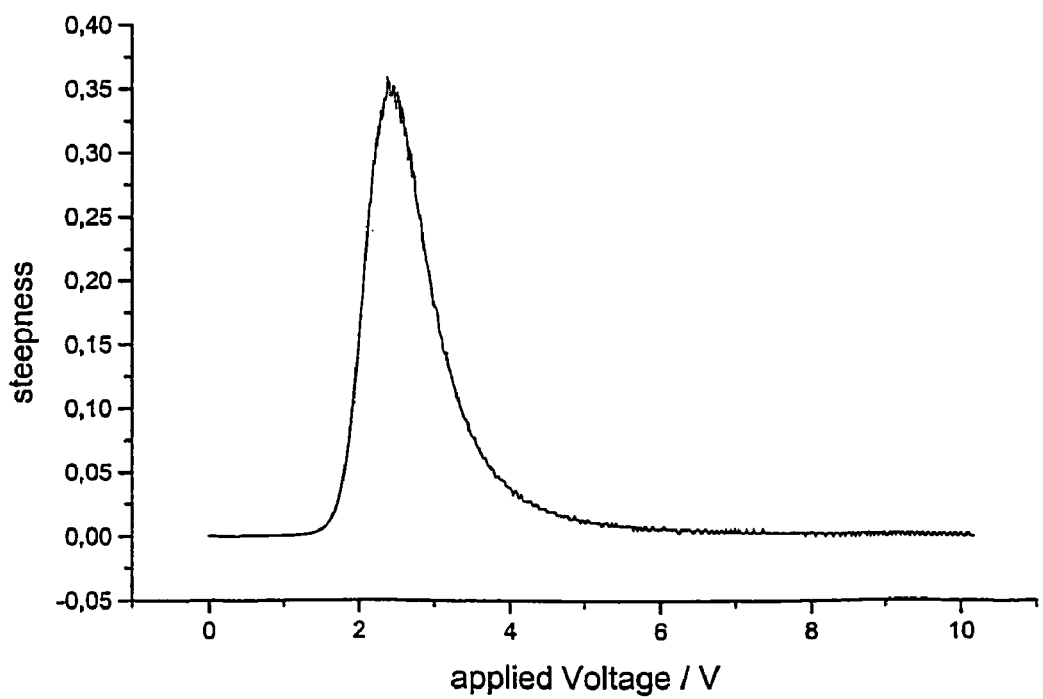
Figure 1.2

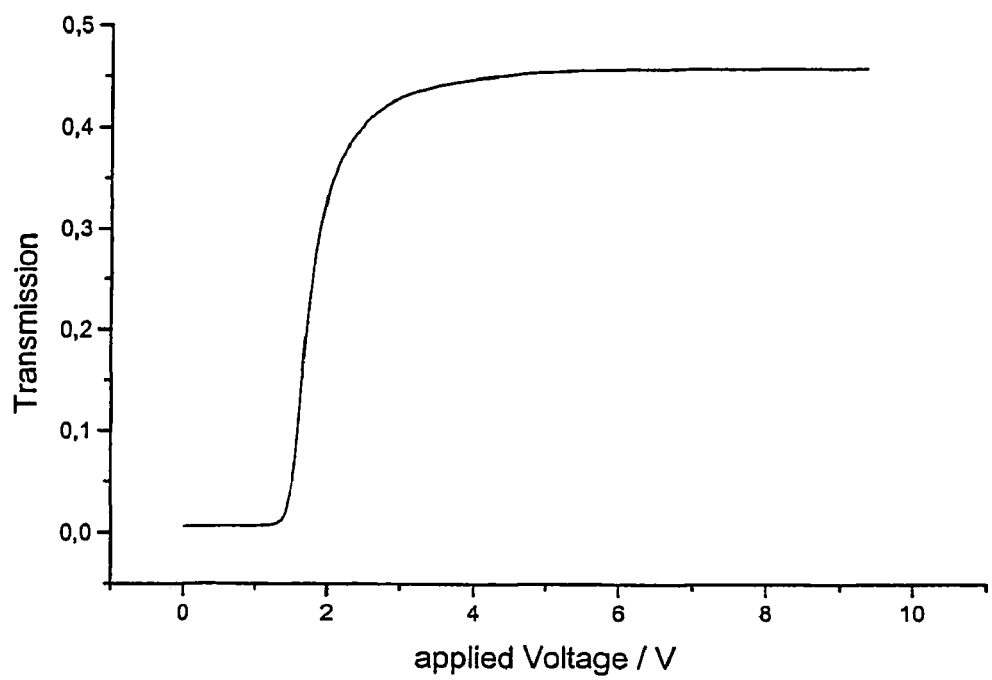
Figure 2.1
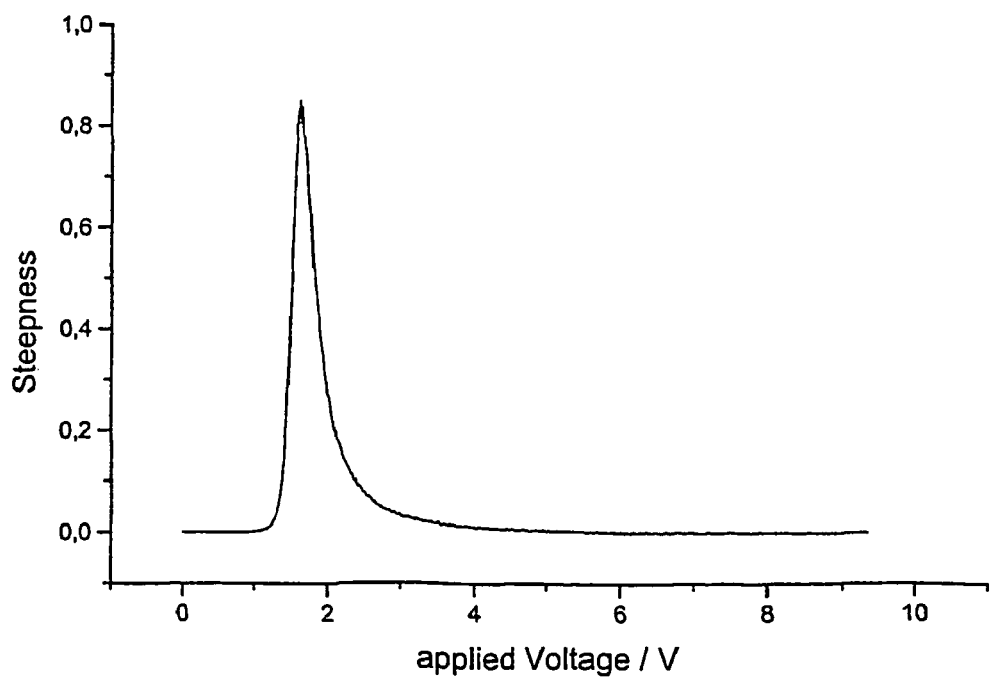
Figure 2.2

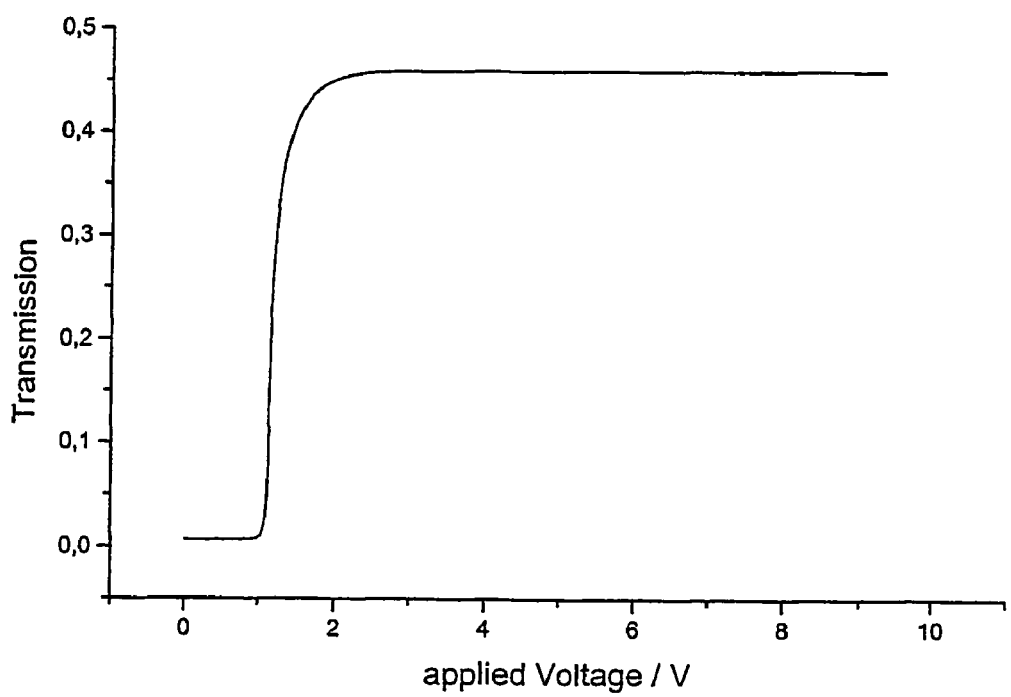
Figure 3.1
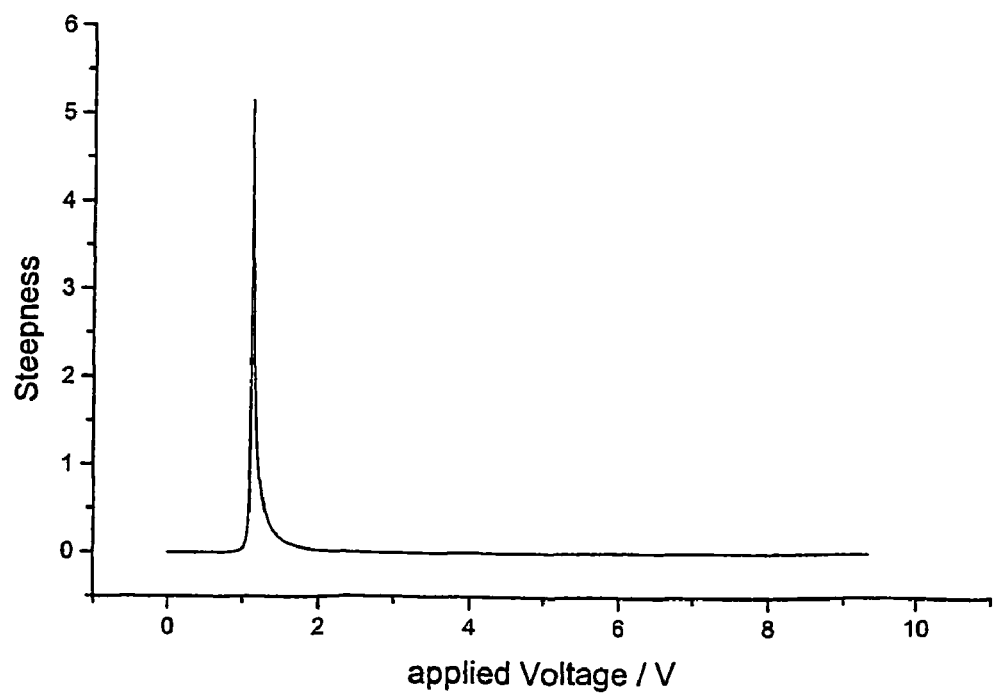
Figure 3.2

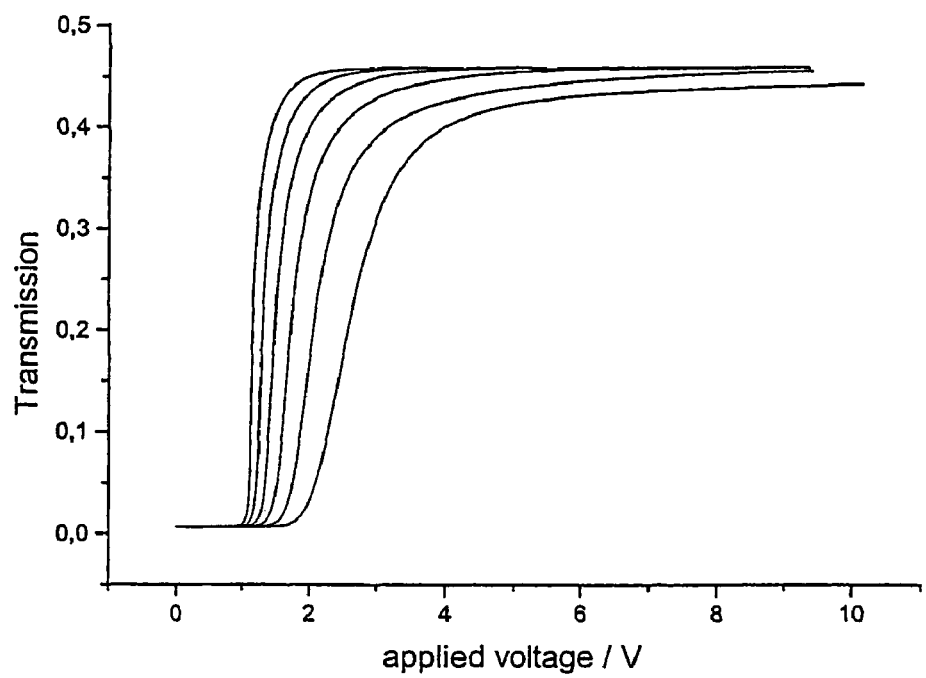
Figure 4.1
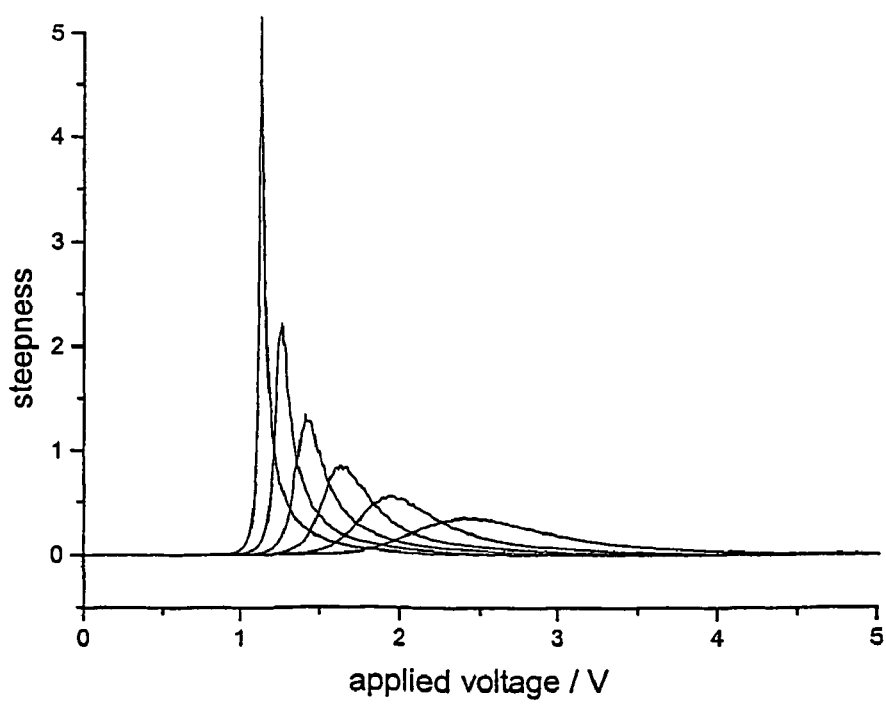
Figure 4.2

HOMEOTROPIC ALIGNMENT LAYER

FIELD OF THE INVENTION

The invention relates to an alignment layer comprising a polymerized liquid crystal material with homeotropic orientation, to methods of its preparation, to polymerizable liquid crystal compositions and liquid crystal polymers used for the preparation of the alignment layer, to liquid crystal devices comprising the alignment layer, and to a method of controlling the electrooptical steepness of a liquid crystal display comprising at least one alignment layer by varying the surface anchoring energy of the alignment layer.

BACKGROUND AND PRIOR ART

In liquid crystal displays (LCDs) it is usually required to control the alignment of the liquid crystal medium at the inner surface of the substrates forming the display cell. For example, parallel or tilted orientation of the liquid crystal molecules relative to the plane of the substrate is achieved by applying rubbed polyimide alignment layers to the substrate surfaces. Another common method to induce uniform alignment is for example the oblique evaporation of inorganic materials like silicon-oxide ($SiO_x$) onto the substrate surfaces.

Reviews of conventional alignment techniques are given for example by I. Sage in "Thermotropic Liquid Crystals", edited by G. W. Gray, John Wiley & Sons, 1987, pages 75–77, and by T. Uchida and H. Seki in "Liquid Crystals—Applications and Uses Vol. 3", edited by B. Bahadur, World Scientific Publishing, Singapore 1992, pages 1–63. A review of alignment materials and techniques is given by J. Cognard, Mol. Cryst. Liq. Cryst. 78, Supplement 1 (1981), pages 1–77.

Many applications, like for example LCDs of the VA (vertical aligned) or SSCT (surface stabilized cholesteric texture) mode, require vertical or so-called homeotropic alignment of the liquid crystal medium, wherein the liquid crystal molecules are oriented with their long molecular axis substantially perpendicular to the plane of the substrate. In prior art, the following techniques have been suggested to achieve homeotropic alignment:

1. Use materials that intrinsically have very low surface energies, for example fluorinated polymers such as PTFE. In this case the energy of the system is minimized by having the LC molecules in contact with each other rather than with the surface. This leads to a homeotropic alignment, but with rather a weak anchoring energy.

2. Coat the substrate surface with a surfactant that "seeds" the required alignment. For homeotropic alignment one can achieve this by using a layer of hydrocarbon chains tethered at one end to the surface. Just from steric considerations one expects that if the surface coverage is sufficient these chains will pack to be on average normal to the surface. If the interaction between the chains and the LC molecules is sufficiently strong then this alignment should seed a homeotropic alignment in the LC. This is the conventional approach to achieving homeotropic alignment and is the basis of most organometallic chrome complexes and of lecithin which are commmonly used in the research lab. This approach does generate strong homeotropic alignment, but it depends on getting a very uniform, very thin (ideally a monolayer) coating of the material. This is often difficult to achieve. The stability of these materials is often not ideal, and cells do sometimes exhibit ageing presumably because the alignment layers become detached from the surface and dissolve into the LC. In addition these materials are often ionic and so result in an unwanted increase in the conductivity of the LC.

3. Coat the substrate surface with a polymer that induces homeotropic alignment, for example a suitably modified polyimide material. A disadvantage of these materials is that they require a high temperature (typically about 180° C.) bake to cure them. If a plastic substrate is being used this may not be desirable.

4. Inorganic oxides e.g. SiO can give homeotropic alignment when deposited onto the surface at a controlled angle. The disadvantage of this approach is that the deposition can be difficult to control over large areas and requires vacuum deposition.

It has also been suggested in prior art to use liquid crystal polymer layers for inducing planar or tilted alignment in a liquid crystal display. U.S. Pat. No. 5,262,882 describes an orientation layer for inducing planar orientation in a liquid crystal display, consisting of a polymer network in which a low molar mass liquid crystal material is dispersed. U.S. Pat. No. 5,155,160 discloses a liquid crystalline auxiliary layer for inducing tilted orientation in a liquid crystal display cell, which is formed from an anisotropic gel composition comprising a mesogenic diacrylate and a low molar mass liquid crystal mixture. JP 2000-212310, WO 00/46634 and WO 00/46635 disclose an alignment layer for inducing a preferred pretilt in a liquid crystal medium, which is obtained by photoalignment of a photopolymer or a photopolymer/monomer mixture by photoradiation at an oblique angle or by photoradiation with circularly polarized light.

It was an aim of the present invention to provide an alignment layer that induces improved vertical or homeotropic alignment in a liquid crystal medium, and does not show the drawbacks of alignment layers of prior art as described above.

The inventors of the present invention have found that the above drawbacks can be overcome, and satisfactory homeotropic alignment of a liquid crystal medium can be achieved by using an alignment layer of polymerized liquid crystal material comprising rod-shaped molecules with homeotropic orientation, in particular a layer of homeotropic nematic or homeotropic smectic A liquid crystal polymerized material.

In particular it was found that an alignment layer of homeotropic liquid crystal polymerized material exhibits a particularly high surface anchoring energy and yields strong homeotropic alignment in a liquid crystal medium.

Another aspect of the invention relates to the influence of the alignment force on the steepness of the electrooptical curve of an LCD, in particular of a VA mode LCD. Thus, the inventors have surprisingly found that there is a correlation between the surface anchoring energy of vertically aligned liquid crystals, expressed by the tilt anchoring parameter, and the corresponding steepness of the electrooptical curve in LC displays, especially in VA mode displays. In detail, the steepness of the electrooptical curve was found to increase with decreasing anchoring energy.

Based on this finding it is possible to control the steepness of the electrooptical curve of an LCD, in particular of a VA mode display, by using alignment layers of varying anchoring strength. In practical applications of LCDs it is often desired to reduce the steepness of the electrooptical curve to allow for better grey level differentiation. This can be achieved by using inventive alignment layers which exhibit strong anchoring energy and thus lead to reduced steepness.

SUMMARY OF THE INVENTION

One aspect of the present invention is an alignment layer comprising a polymerized liquid crystal material with homeotropic orientation.

Another aspect of the present invention is an alignment layer as described above or below, comprising a polymerized liquid crystal material that is polymerized in its nematic or smectic, in particular in its smectic A phase.

Another aspect of the present invention is an alignment layer as described above or below, comprising a polymerized liquid crystal material with homeotropic orientation having a high surface anchoring energy.

Another aspect of the present invention is a process of preparing an alignment layer as described above or below, by applying a layer of a polymerizable mesogenic or liquid crystal material onto a substrate, aligning the material into homeotropic orientation, polymerizing the material and optionally removing the polymerized film from the substrate.

Another aspect of the present invention is a polymerizable liquid crystal material with a nematic or smectic phase, in particular a smectic A phase, that can be used for the preparation of an alignment layer with homeotropic orientation as described above or below.

Another aspect of the present invention is the use of an alignment layer as described above or below for generating homeotropic alignment in a liquid crystal medium.

Another aspect of the present invention is a liquid crystal device, in particular a liquid crystal display, comprising an alignment layer as described above and below.

Another aspect of the present invention is a liquid crystal device comprising an alignment layer as described above and below that is in contact with a liquid crystal medium and induces homeotropic alignment in the liquid crystal medium in the regions of contact.

Another aspect of the present invention is a bistable or multistable liquid crystal device, in particular a bistable or multistable display comprising a nematic or cholesteric liquid crystal medium, wherein the liquid crystal medium can adopt at least two stable configurations, comprising an alignment layer as described above and below.

Another aspect of the present invention is a liquid crystal display of the VA (vertically aligned), VAN (vertically aligned nematic) or VAC (vertically aligned cholesteric), ECB (electrically controlled birefringence), DAP (deformation of aligned phases), CSH (colour super homeotropic), hybrid alignment, HAN (hybrid aligned nematic), SSCT (surface stabilized cholesteric texture), PSCT (polymer stabilized cholesteric texture), flexoelectric or ULH (uniformly lying helix) mode, which can be of the transmissive, reflective or transflective type, comprising an alignment layer as described above and below.

Another aspect of the present invention is the use of an alignment layer as described above or below as substrate, or as alignment or auxiliary layer applied on a substrate, in the preparation of anisotropic or liquid crystal polymer films with homeotropic structure from polymerisable LC materials, in order to induce homeotropic orientation in the polymerisable LC material.

Another aspect of the present invention is an anisotropic or liquid crystal polymer film with homeotropic structure which is prepared from a polymerisable liquid crystal material on a homeotropic alignment layer as described above and below.

Another aspect of the present invention is a method of controlling the electrooptical steepness of a liquid crystal display, in particular a display of the VA mode, comprising at least one alignment layer, by varying the surface anchoring energy of the alignment layer.

Definition of Terms

In connection with a liquid crystal medium provided between two substrates or a liquid crystal polymer film as described in the present application, the following definitions of terms as used throughout this application are given.

The terms 'vertical or homeotropic structure', 'vertical or homeotropic orientation' and 'vertical or homeotropic alignment' mean that the optical axis of the film or medium is substantially perpendicular to the film plane or the substrate plane, respectively, i.e. substantially parallel to the film or substrate normal. This definition also includes films and media wherein the optical axis is slightly tilted at an angle of up to 2 to 5 degrees relative to the film normal or substrate normal.

For sake of simplicity, a film with a homeotropic orientation is hereinafter being shortly referred to as 'homeotropic film'.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For sake of simplicity, the term 'liquid crystal material' is used hereinafter for both liquid crystal materials and mesogenic materials, and the term 'mesogen' is used for the mesogenic groups of the material.

In a liquid crystal display according to the present invention comprising a liquid crystal medium and an alignment layer, the surface anchoring strength of the liquid crystal molecules at the surface of the alignment layer is expressed by the tilt anchoring parameter $\tau$.

A value of $\tau=0$ means that the liquid crystal molecules are strongly anchored. A value of $\tau=1$ means that the liquid crystal molecules are freely rotating, without being significantly anchored. The values of $\tau$ are correlated to experimental data according to Mada et al., Jap. Journ. Appl. Phys. 38, L1118–L1120 (1999). Thus, a value of $\tau=1$ (not anchored) corresponds to a surface anchoring energy of about $10^{-10}$ J/m$^2$, and a value of $\tau=0$ (strongly anchored) corresponds to a surface anchoring energy of about $10^{-5}$ J/m$^2$.

The surface energy can be determined for example by contact angle measurements using standard equipment and methods that are known to those skilled in the art. The determination of the surface anchoring energy is also described e.g. in the following references:

Y. Marinov, N. Shonova, C. Versace, A. G. Petrov, "*Flexoelectric spectroscopy measurements of surface dissipation of energy and surface viscosity of weakly anchored homeotropic nematics*" Mol. Cryst. Liq. Cryst. Sci. Technol., Sect. A (1999), 329, 1145–1150.

V. Sergan, G. Durand, "*Anchoring anisotropy of a nematic liquid crystal on a bistable SiO evaporated surface*", Liq. Cryst. (1995), 18(1), 171–4, M. Vilfan, M. Copic, "*Comparison of dynamic and static measurements of surface anchoring energy in nematic liquid crystals*", Mol. Cryst. Liq. Cryst. Sci. Technol., Sect. A (2000), 351, 419–426, J. G. Fonseca, Y. Galerne, "*Local measurement of the zenithal anchoring strength*", Phys. Rev. E: Stat. Phys., Plasmas, Fluids, Relat. Interdiscip. Top. (2000), 61(2), 1550–1558, T. Akahane, H. Kaneko, M. Kimura, "*Novel method of measuring surface torsional anchoring strength of nematic liquid crystals*", Jpn. J. Appl. Phys., Part 1 (1996), 35(8), 4434–4437, JP-A-06-265840, "*Method for measuring boundary anchoring strength of liquid crystal display device*", A. Sugimura, T. Miyamoto, M. Tsuji, M. Kuze, Appl. Phys. Lett. (1998), 72(3), 329–331, F. Yang, J. R. Sambles, J. Appl. Phys. (2000), 87(6), 2726–2735.

BRIEF DESCRIPTION OF THE DRAWINGS

FIGS. 1.1 and 1.2 show the electrooptic curve (transmission versus applied voltage) and the full steepness curve (numerical gradient of the electrooptical curve), respectively, of a VA cell according to example 3 of the present invention comprising an alignment layer with a tilt anchoring parameter of 0.

FIGS. 2.1 and 2.2 show the electrooptic curve and full steepness curve of a VA cell according to example 3 of the present invention comprising an alignment layer with a tilt anchoring parameter of 0.4.

FIGS. 3.1 and 3.2 show the electrooptic curve and full steepness curve of a VA cell according to example 3 of the present invention comprising an alignment layer with a tilt anchoring parameter of 1.

FIGS. 4.1 and 4.2 show the electrooptic curve and full steepness curve of a VA cell according to example 3 of the present invention comprising an alignment layer with a tilt anchoring parameter of (from left to right) 1, 0.8, 0.6, 0.4 and 0, respectively.

DETAILED DESCRIPTION OF THE INVENTION

Preferred embodiments of the invention relate to alignment layers wherein the tilt angle of the polymerized liquid crystal material is from 0 to 5° relative to the normal of the layer, the tilt angle of the polymerized liquid crystal material is from 0 to 2°, preferably from 0 to 1°, very preferably 0°, relative to the normal of the layer, the polymerizable liquid crystal material exhibits a nematic phase, the polymerizable liquid crystal material exhibits a smectic phase, the polymerizable liquid crystal material exhibits a smectic A phase, the polymerized liquid crystal material exhibits a nematic phase, the polymerized liquid crystal material exhibits a smectic phase, the polymerized liquid crystal material exhibits a smectic A phase, the polymerized liquid crystal material forms a 3-dimensional network, the polymerizable liquid crystal material comprises less than 50%, preferably less than 20%, very preferably less than 10%, in particular less than 5% of non-polymerizable compounds, the polymerized liquid crystal material comprises less than 50%, preferably less than 20%, very preferably less than 10%, in particular less than 5% of unpolymerized material, the tilt anchoring parameter τ is from 0 to 0.6, very preferably from 0 to 0.4.

A homeotropic alignment layer of the present invention can be prepared by coating a substrate with a thin layer of a polymerizable LC material, which is then polymerized to form a solid layer. When coated onto a substrate with an open surface in contact with air or an inert gas like for example nitrogen, the polymerizable LC material prior to polymerization will tend to align with the LC director normal to the LC/air boundary and hence normal to the substrate. Homeotropic alignment of the coated polymerizable LC material can also be induced or improved by known methods like surface treatment or rubbing of the substrate. The preparation of polymerized liquid crystal films with homeotropic orientation is also described in WO 98/00475, the entire disclosure of which, and of all patents issuing thereof, is incorporated into this application by way of reference.

This alignment is then fixed by polymerizing the coated LC material, e.g. by exposure to heat or actinic radiation. A suitable method is photopolymerization by exposure to UV light. When placed in contact with an LC material, for example with a nematic LC material, the homeotropic alignment of the polymerized LC alignment material tends to seed the alignment of the nematic LC material so that it too tends to align normal to the substrate surface, that is homeotropic alignment.

The polymerizable LC alignment material of the present invention has the advantages that it exhibits a particularly high surface anchoring energy and yields strong homeotropic alignment in a liquid crystal medium. Moreover, it is relatively easy to apply to a substrate, does not require a high temperature bake, and is more stable than the surfactants that are normally used in prior art. In addition there is the potential to modify the chemical nature of the material to optimize its interaction with the nematic LC material and so tune the strength of the anchoring energy.

Alignment layers obtained from a liquid crystal material, preferably with rod-shaped mesogens, that is polymerized in the smectic phase, preferably in the smectic A phase, were found to exhibit a high tilt anchoring energy and are particularly preferred.

The polymerizable liquid crystal material preferably comprises one or more polymerizable compounds having at least one polymerizable group.

The polymerizable material may also comprise polymerizable mesogenic compounds having two or more polymerizable functional groups (herein also referred to as di-/multireactive or di-/multifunctional compounds). Upon polymerization of such a mixture a three-dimensional polymer network is formed. An alignment layer comprising such a network is self-supporting and shows a high mechanical and thermal stability and low temperature dependence of the physical and optical properties. An alignment layer comprising a linear, i.e. non-crosslinked polymer or a polymer with low crosslink density on the other hand shows usually better adhesion to the substrate of the liquid crystal cell.

By varying the concentration of the multifunctional compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

Another aspect of the invention relates to the influence of the alignment force on the steepness of the electrooptical curve of an LCD, in particular of a VA mode LCD. The inventors have found that there is a correlation between the surface anchoring energy of vertically aligned liquid crystals, expressed by the tilt anchoring parameter τ, and the corresponding steepness of the electrooptical curve in LC displays, especially in VA mode displays. The steepness of the electrooptical curve was found to increase with decreasing anchoring energy.

By using an alignment layer of the present invention with high anchoring energy, it is possible to reduce the steepness of the electrooptical curve of an LCD, in particular of a VA mode display.

Furthermore, by varying the anchoring energy of the alignment layer, it is possible to control the steepness of the electrooptical curve of the display and adapt it to the desired use. The anchoring energy of an alignment layer of the invention can for example be controlled by varying the parameters of the polymerizable material and the polymerized alignment layer. For the polymerizable material such parameters are for example the chemical composition or the liquid crystalline phase behaviour. For example a polymerizable material with a smectic phase yields an alignment layer with a particular high surface anchoring energy. For the polymerized alignment layer such parameters are for example the polymerization conditions, the degree of polymerization, the layer thickness or the molecular weight, crosslink density or chain length of the polymer. The molecular weight or chain length of the polymer can for example be reduced by using chain transfer agents.

Especially preferably the polymerizable liquid crystal material comprises one or more compounds selected of formula I P-Sp-X-MG-R    I wherein P is a polymerizable group, Sp is a spacer group or a single bond, X is —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CH—, —CF=CH—, —CH=CF—, —CF=CF—, —C≡C—, —CH=CH—COO—, —OCO—CH=CH— or a single bond, MG is a mesogenic group, R is H, F, Cl, Br, I, CN, SCN, SF$_5$H, NO$_2$, or a straight—cahin or branched alkyl group with 1 to 20 C-atoms, which may be unsubstituted, mono- or poly-substituted by F, Cl, Br, I or CN, it being also possible for one or more non-adjacent CH$_2$ groups to be replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CH=CH— or —C≡C— in such a manner that O and/or S atoms are not linked directly to one another, or denotes P-Sp-X—, and R$^0$ and R$^{00}$ are independently of each other H or alkyl with 1 to 12 C-atoms.

In a preferred embodiment of the present invention MG is of formula II

-A$^1$-(Z-A$^2$)$_m$-    II wherein

Z is in each case independently —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CH—, —CF=CH—, —CH=CF—, —CF=CF—, —C≡C—, —CH=CH—COO— or —OCO—CH=CH—, R$^0$ has one of the meanings given in formula I, A$^1$ and A$^2$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, indane-2,5-diyl, 1,4-bicyclo (2,2,2) octylene, piperidine-1,4-diyl, naphthalene-2,6-diyl, decahydronaphthalene-2,6-diyl, or 1,2,3,4-tetrahydronaphthalene-2,6-diyl, it being possible for all these groups to be unsubstituted, mono- or polysubstituted with F, Cl, OH, CN or NO$_2$ or alkyl, alkoxy, alkylcarbonyl or alkoxycarbonyl groups having 1 to 7 C atoms wherein one or more H atoms may be substituted by F or Cl, and m is 0, 1, 2 or 3.

Particularly preferred are compounds wherein the mesogenic group A$^1$-(Z-A$^2$)$_m$ incorporates two or three five- or six-membered rings.

Further preferred are compounds wherein at least one radical Z denotes —C≡C—. These compounds are especially suitable for uses where highly birefringent materials are needed.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, OH, CN, NO$_2$ or an optionally fluorinated alkyl, alkoxy, alkylcarbonyl or alkoxycarbonyl group with 1 to 7 C atoms, and Cyc is 1,4-cyclohexylene. Z has one of the meanings of formula II. The list is comprising the following subformulae as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |

-continued

| | |
|---|---|
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the subformulae II-1, II-2, II-4, II-6, II-7, II-8, II-11, II-13, II-14, II-15 and II-16.

Preferably Z is —COO—, —OCO—, —CH₂CH₂—, —C≡C— or a single bond.

Very preferably the mesogenic group MG is selected from the following formulae and their mirror images

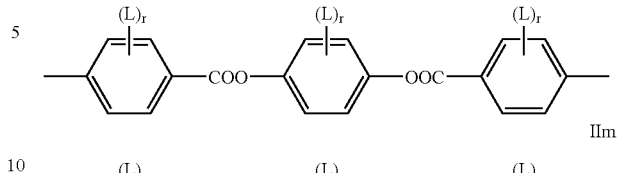

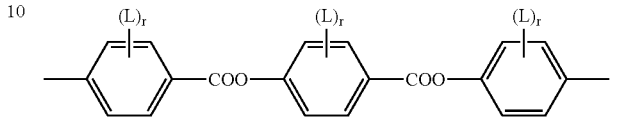

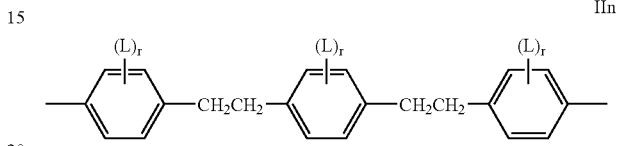

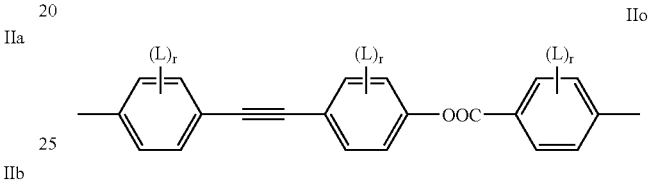

wherein L has the meaning given above and r is 0, 1 or 2.
The group

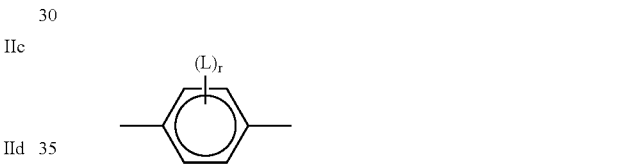

in these preferred formulae is very preferably denoting

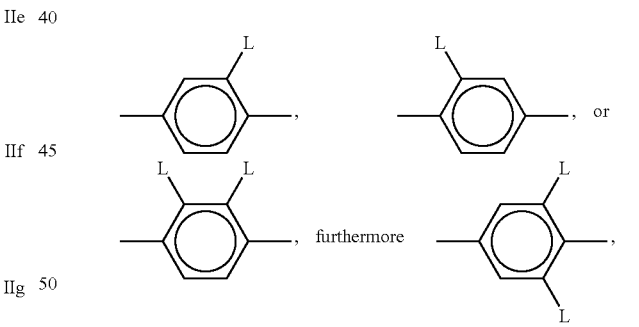

with L having each independently one of the meanings given above.

Particularly preferred are the subformulae IId, IIg, IIh, IIi, IIk and IIo, in particular the subformulae IId and IIk.

L is preferably F, Cl, CN, OH, NO₂, CH₃, C₂H₅, OCH₃, OC₂H₅, COCH₃, COC₂H₅, COOCH₃, COOC₂H₅, CF₃, OCF₃, OCHF₂, OC₂F₅, in particular F, Cl, CN, CH₃, C₂H₅, OCH₃, COCH₃, CF₃ and OCF₃, most preferably F, Cl, CH₃, OCH₃ and OCF₃.

If R in formula I is an alkyl or alkoxy radical, i.e. where the terminal CH₂ group is replaced by —O—, this may be straight-chain or branched.

It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Especially preferably R is straight chain alkyl or alkoxy with 1 to 8 C atoms.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8-, 9-oxadecyl, for example.

Halogen is preferably F or Cl.

R in formula I can be a polar or an unpolar group. In case of a polar group, R is selected from CN, $NO_2$, halogen, $OCH_3$, OCN, SCN, $COR^1$, $COOR^1$ or a mono- oligo- or polyfluorinated alkyl or alkoxy group with 1 to 4 C atoms. $R^1$ is optionally fluorinated alkyl with 1 to 4, preferably 1 to 3 C atoms. Especially preferably polar groups R are selected of F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of F, Cl, CN, $OCH_3$ and $OCF_3$. In case of an unpolar group, R is preferably alkyl with up to 15 C atoms or alkoxy with 2 to 15 C atoms.

Compounds of formula I containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

Another preferred embodiment of the present invention relates to compounds of formula I wherein R is denoting P-Sp-$X_n$—.

The polymerisable group P is preferably selected from $CH_2$=$CW^1$—COO—,

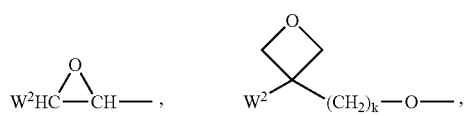

$CH_2$=$CW^2$—O—, $CH_3$—CH=CH—O—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, Phe-CH=CH—, HOOC—, OCN— and $W^4W^5W^6$Si—, with $W^1$ being H, Cl, CN, phenyl or alkyl with 1 to 5 C-atoms, in particular H, Cl or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

P is particularly preferably an acrylate, methacrylate, vinyl, vinyloxy, epoxy, styrene or propenyl ether group, in particular an acrylate, methacrylate, vinyl or epoxy group.

As for the spacer group Sp all groups can be used that are known for this purpose to those skilled in the art. The space group Sp is preferably a straight chain or branched alkylene group having 1 to 20 C atoms, in particular 1 to 12 C atoms, in which, in addition, one or more non-adjacent $CH_2$ groups may be replaced by —O—, —S—, —$NR^0$—, —CO—, —O—CO—, —S—CO—, —O—COO—, —CO—S—, —CO—O—, —CH(halogen)-, —C(halogen)$_2$, —CH(CN)—, —CH(OH)—, —$CD_2$-, —CH=CH—, —CF=CF—, —CH=CF— or —C≡C—, or a siloxane group, and in which one or more H atoms may be replaced by halogen, CN or OH.

Typical spacer groups are for example —($CH_2$)$_o$—, —($CH_2CH_2$O)$_p$—$CH_2CH_2$—, —$CH_2CH_2$—S—$CH_2CH_2$— or —$CH_2CH_2$—NH—$CH_2CH_2$—, or —($SiR^0R^{00}$—O)$_q$—, with o being an integer from 2 to 12, p being an integer from 1 to 3, q being an integer from 1 to 3, and $R^0$ and $R^{00}$ having the meanings given above.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyliminoethylene, 1-methylalkylene, ethenylene, propenylene and butenylene for example.

Especially preferred are compounds of formula I wherein Sp is denoting alkylene or alkylene-oxy with 2 to 8 C atoms. Straight-chain groups are especially preferred.

In the event that R is denoting P-Sp-X—, the two spacer groups Sp in the compounds of formula I may be identical or different.

Of the preferred compounds described above particularly preferred are those wherein n is 1.

Further preferred are compounds with one or more groups P-Sp-X— wherein n is 0.

In case of multiple occurrence of the group P, Sp and X, respectively, the multiply occurring groups may be identical or different.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

Examples of suitable polymerizable mesogenic compounds that can be used as components of the polymerizable composition are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention. Preferably the polymerizable mixture comprises at least one polymerizable mesogenic compound having one polymerizable functional group and at least one polymerizable mesogenic compound having two or more polymerizable functional groups.

Examples of especially useful polymerizable mesogenic compounds are shown in the following list of compounds, which should, however, be taken only as illustrative and is in no way intended to restrict, but instead to explain the present invention:

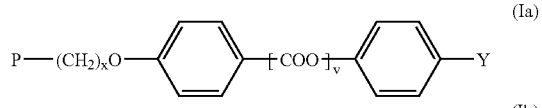
(Ia)

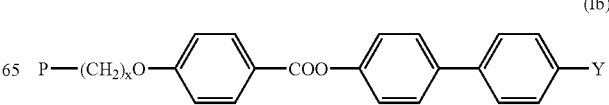
(Ib)

-continued

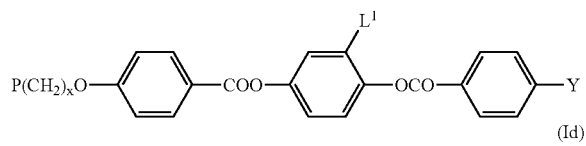
(Ic)

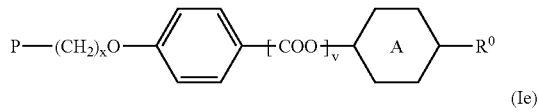
(Id)

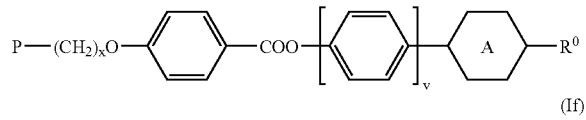
(Ie)

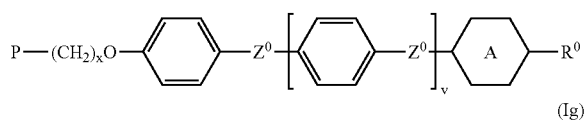
(If)

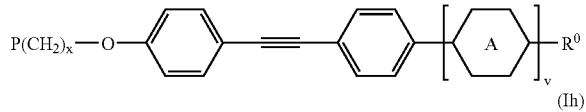
(Ig)

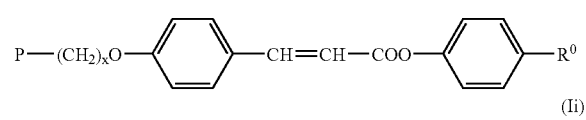
(Ih)

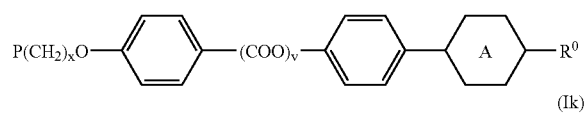
(Ii)

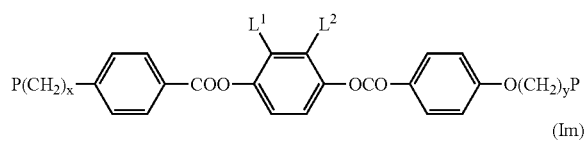
(Ik)

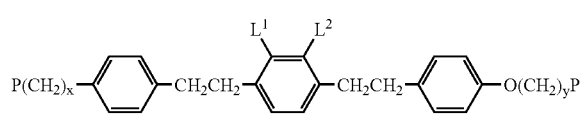
(Im)

In the above formulae, P has one of the meanings of formula I and its preferred meanings as mentioned above, x and y are identical or different integers from 1 to 12, A is 1,4-phenylene that is unsubstituted or substituted in 2-, 3- and/or 5-position by $L^1$ or denotes 1,4-cyclohexylene, $Z^0$ has one of the meanings of $Z^1$ in formula II, v is 0 or 1, Y is a polar group as defined above, $R^0$ is an unpolar alkyl or alkoxy group and $L^1$ and $L^2$ are each independently H, F, Cl, CN, OH, $NO_2$ or an optionally halogenated alkyl, alkoxy or carbonyl group with 1 to 4 C atoms, and the 1,4-phenylene rings in the above formulae may also be substituted in 2-, 3- and/or 5-position by $L^1$.

The term unpolar group in this connection preferably denotes an alkyl group with 1 or more, preferably 1 to 15 C atoms or an alkoxy group with 2 or more, preferably 2 to 15 C atoms.

The orientation of the mesogenic material depends, inter alia, on the film thickness, the type of substrate material, and the composition of the polymerizable mesogenic material. It is therefore possible, by changing these parameters, to control the structure of the polymer film, in particular specific parameters such as the tilt angle and its degree of variation.

Thus, for the preparation of a homeotropic film, it is possible to improve the alignment by appropriate selection of the ratio of monoreactive mesogenic compounds, i.e. compounds with one polymerizable group, and direactive mesogenic compounds, i.e. compounds with two polymerizable groups.

The amount of polymerizable compounds with two or more polymerizable groups in the polymerizable material is preferably from 5 to 25% by weight of the total mixture. In another preferred embodiment, the polymerizable mixture contains no polymerizable compounds with more than one polymerizable group.

Especially preferably the polymerizable liquid crystal material comprises
a) 25 to 80%, in particular 30 to 70%, very preferably 40 to 60% of one or more monoreactive polymerizable mesogenic compounds, preferably selected of formula I, having an unpolar terminal group,
b) 5 to 40%, in particular 10 to 35%, very preferably 15 to 30% of one or more monoreactive polymerizable mesogenic compounds, preferably selected of formula I, having a polar terminal group,
c) 0 to 65%, in particular 2 to 45%, very preferably 5 to 25% of one or more polymerizable mesogenic compounds, preferably selected of formula I, having two or more polymerizable groups,
d) 0.01 to 5% of a photoinitiator.

Very preferred are mixtures wherein the ratio of components a:b is ranging from 5:2 to 3:2, and mixtures wherein the ratio of monoreactive compounds to direactive compounds is ranging from 3:1 to 1:1. Further preferred are mixtures wherein the ratio of components a:b:c is approximately 2:1:1.

Preferably the mixtures comprise 2 to 8, in particular 2 to 6, most preferably 2 to 4 compounds of components a and b, and 1 to 3 compounds of component c.

The mixtures may also comprise further components, like stabilizers, inhibitors, chain transfer agents, dyes, surfactants or non-mesogenic crosslinkers.

The compounds of component a) are preferably selected from formula Id-Ii above. The compounds of component b) are preferably selected from formulae Ia–Ic above. The compounds of component c) are preferably selected from formula Ik and Im above.

The spacer groups in the compounds of formula Ia-Im and the alkyl terminal groups in the compounds of formula Id-Ii are preferably selected from propylene to hexylene. The alkyl chain length (either spacer or terminal groups) of the components and their concentration is optimised to provide a smectic phase at an appropriate temperature above the temperature that will occur during cure of the film. To increase smectic phase behaviour, spacer groups or terminal alkyl groups higher than hexylene, like for example heptylene, octylene, nonylene, decylene, undecylene or dodecylene, are also suitable.

Especially preferred is a polymerizable mixture comprising
a) 40 to 60% of one or more compounds of formula Ie, in particular wherein v is 1 and A is 1,4-cyclohexylene,
b) 15 to 25% of one or more compounds of formula Ia, in particular wherein v is 1 and Y is CN,
c) 5 to 30% of one or more compounds of formula Ik, in particular wherein $L^1$ is $CH_3$ and $L^2$ is H, d) 0.01 to 5% of a photoinitiator.

The polymerizable mesogenic material is coated onto substrate, aligned into a uniform orientation and polymerized according to a process as described in WO 98/12584 or GB 2,315,072, thereby permanently fixing the orientation of the polymerizable mesogenic material.

As a substrate for example a glass or quartz sheet or a plastic film or sheet can be used. Suitable plastic substrates are for example films of polyethyleneterephthalate (PET), polyvinylalcohol (PVA), polycarbonate (PC) or triacetylcellulose (TAC).

The alignment layer of the present invention is preferably prepared directly on the inner surface of the substrates or electrodes forming the liquid crystal cell of a display. This is achieved for example by coating and polymerizing the polymerizable mesogenic material on the substrate, which is typically a glass plate covered with a transparent layer of conductive material like indium tin oxide (ITO) layer, for example by spin coating, and polymerizing the coated and aligned material. The polymerizable material can be applied directly on the ITO layer, however, the substrate may also comprise an additional alignment layer above the ITO layer, onto which the polymerizable material is coated. It is also possible that the substrate comprises further layers, like e.g. colour filters, protective or passviation layers or black layers, on top or below the ITO layer.

It is also possible to put a second substrate on top of the coated mixture prior to and/or during and/or after polymerization, which can be removed after polymerization. When curing between two substrates exposure to by actinic radiation, at least one substrate has to be transmissive for the actinic radiation used for the polymerization. Isotropic or birefringent substrates can be used.

The polymerizable mesogenic material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

The preparation of polymerized liquid crystal films with homeotropic orientation is also described in WO 98/00475, the entire disclosure of which is incorporated into this application by way of reference. Homeotropic alignment can be achieved e.g. by means of an alignment layer coated on top of the substrate. Suitable aligning agents used on glass substrates are for example alkyltrichlorosilane, chrome complexes or lecithin, whereas for a plastic substrate thin layers of lecithin, silica or high tilt polyimide orientation films as aligning agents may be used. In a preferred embodiment of the invention a silica coated plastic film is used as a substrate. Furthermore, homeotropic alignment can be achieved by using aluminium oxide films as described in GB 2,324,382.

Further suitable methods and agents to achieve homeotropic alignment are described in T. Uchida and H. Seki in "Liquid Crystals—Applications and Uses Vol. 3", edited by B. Bahadur, World Scientific Publishing, Singapore 1992, pages 1–63, and in J. Cognard, Mol. Cryst. Liq. Cryst. 78, Supplement 1 (1981), pages 1–77. Suitable materials are for example surface coupling agents having perpendicularly aligned alkyl chains or fluorocarbon chains, like lecithin or quaternary ammonium surfactants such as HTAB (hexadecyl-trimethyl ammonium bromide), DMOAP (N,N-dimethyl-N-octadecyl-3-aminopropyltrimethoxysilyl chloride) or N-perfluoroctylsulphonyl-3-aminopropyltrimethyl ammonium iodide (Uchida et al.), silane polymers like polymethoxysilane or fluorinated polymers like Teflon.

Polymerization of the polymerizable mesogenic material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is preferably carried out in the presence of an initiator absorbing at the wavelength of the actinic radiation. For example, when polymerizing by means of UV light, a photoinitiator can be used that decomposes under UV irradiation to produce free radicals or ions that start the polymerization reaction. When curing polymerizable mesogens with acrylate or methacrylate groups, preferably a radical photoinitiator is used, when curing polymerizable mesogens vinyl and epoxide groups, preferably a cationic photoinitiator is used. It is also possible to use a polymerization initiator that decomposes when heated to produce free radicals or ions that start the polymerization. As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable mesogenic material preferably comprises 0.01 to 10%, very preferably 0.05 to 5%, in particular 0.1 to 3% of a polymerization initiator. UV photoinitiators are preferred, in particular radicalic UV photoinitiators.

The curing time is dependening, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, sensitizers, stabilizers, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

In particular the addition of stabilizers is preferred in order to prevent undesired spontaneous polymerization of the polymerizable material for example during storage. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerizable material in order to modify the physical properties of the inventive polymer film. When adding a chain transfer agent, such as monofunctional thiol compounds like e.g. dodecane thiol or multifunctional thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerizable functional groups to the polymerizable material alternatively or in addition to the di- or multifunctional polymerizable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the mixture of polymerizable material comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the polymer film.

In some cases it is of advantage to apply a second substrate to aid alignment and exclude oxygen that may inhibit the polymerization. Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain a polymer film with the desired molecular orientation the polymerization has to be carried out in the liquid crystal phase of the polymerizable mesogenic material. Therefore, preferably polymerizable mesogenic compounds or mixtures with low melting points and broad liquid crystal phase ranges are used. The use of such materials allows to reduce the polymerization temperature, which makes the polymerization process easier and is a considerable advantage especially for mass production.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

The alignment layer and the method to control the electrooptical steepness of the present invention are suitable for liquid crystal displays, in particular those wherein homeotropic surface alignment is required, such as displays of the VA (vertically aligned) mode like VAN (vertically aligned nematic) or VAC (vertically aligned cholesteric), displays of the ECB (electrically controlled birefringence), DAP (deformation of aligned phases) or CSH (colour super homeotropic), mode, cholesteric displays of e.g. the SSCT or PSCT (surface or polymer stabilized cholesteric texture) mode, or displays of the flexoelectric or ULH (uniformly lying helix) mode. They can be applied to displays of the transmissive, reflective or transflective type. It may also be used in displays with hybrid alignment, wherein the liquid crystal molecules at one surface of the LC cell exhibit homeotropic alignment and on the opposite surface exhibit planar alignment, like for example displays of the HAN (hybrid aligned nematic) mode.

A liquid crystal display of the present invention preferably comprises a liquid crystal cell comprising a liquid crystal medium provided between a first and a second electrode, at least one of which is light-transmissive, and wherein the liquid crystal molecules in said medium are oriented homeotropically, i.e. perpendicular to the electrodes, when no external field is applied, and an alignment layer according to the present invention, which is provided on the inner surface of at least one of said first and the second electrode such that it is directly in contact with the liquid crystal medium and induces homeotropic edge alignment in the liquid crystal medium, and may further comprise a first polarizer located on one side of the liquid crystal cell, optionally a second polarizer located such that the liquid crystal cell is sandwiched between the first and second polarizer, optionally one or more optical compensation or retardation layers located adjacent to the liquid crystal cell and/or to the first and second polarizer, optionally a backlight, and optionally further components.

Further preferred are bistable or multistable devices, in particular nematic displays, comprising an alignment layer of the present invention, in particular an alignment layer comprising a polymerized smectic A LC material. In these displays the liquid crystal medium adopts at least two stable configurations. Suitable bistable or multistable displays where the alignment layer can be used to induce homeotropic alignment are described for example in WO98/50821, EP 0 302 479, Martinot-Lagarde et al., Phys. Rev. Lett. (2000), 84(17), 3871–3874, or in G. P. Bryan-Brown, C. V. Brown, J. C. Jones, E. L. Wood, I. C. Sage, P. Brett and J. Rudin, (1997) "Grating aligned bistable nematic device" *Proceedings of Society for Information Display International Symposium. Digest of Technical Papers*, Volume XXVIII, Boston, Mass., USA, May 1997, Chapter 5.3, pp 37–40.

Further preferred are bistable or multistable display devices comprising an alignment layer of the present invention, in particular an alignment layer comprising a polymerized smectic A LC material, and comprising a liquid crystal medium with a chiral nematic or cholesteric phase, which can be switched between at least two different stable states, one of which is a homeotropic state, for example by application of an electric field. Suitable examples are SSCT or PSCT displays, as described for example in WO 92/19695, U.S. Pat. No. 5,384,067, U.S. Pat. No. 5,453,863, U.S. Pat. No. 6,172,720 or U.S. Pat. No. 5,661,533, and displays of the flexoelectric or ULH mode, as described for example in EP 0 971 016, GB 2 356 629, or Coles, H. J., Musgrave, B., Coles, M. J., and Willmoft, J., J. Mater. Chem., 11, p. 2709–2716 (2001).

Apart from liquid crystal displays, the alignment layers of the present invention can also be used in other liquid crystal devices such as for example spatial light modulators for optical computing, or optical switches for routing optical signals.

Furthermore, the alignment layers of the present invention can be used as substrates, or as alignment or auxiliary layers applied on a substrate, in the preparation of anisotropic or liquid crystal polymer films with homeotropic structure from polymerisable LC materials, in order to induce homeotropic orientation in the polymerisable LC material. Anisotropic films with homeotropic structure are described for example in WO 98/00475 and can be used for a wide variety of applications, like for example as compensators or optical retarders.

The examples below are intended to illustrate the invention without representing a limitation. Above and below, percentages are by weight; all temperatures are given in degrees celsius.

The following abbreviations are used:

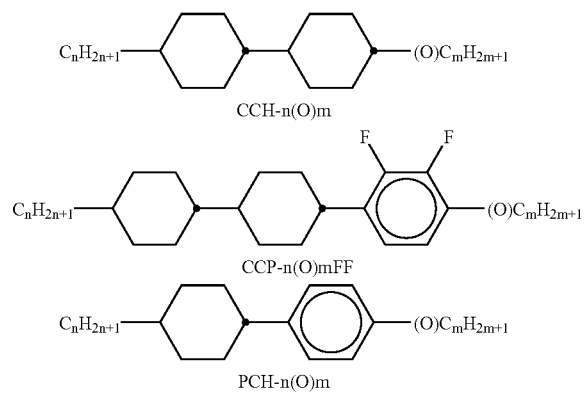

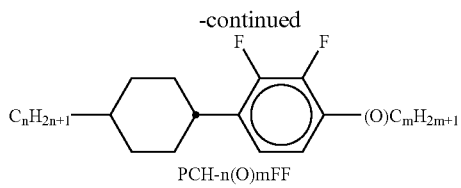

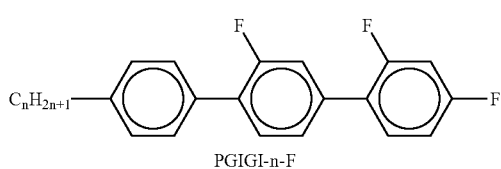

In addition:

$\Delta n$ denotes the optical anisotropy measured at 20° C. and 589 nm, $n_e$ denotes the extraordinary refractive index at 20° C. and 589 nm, $\Delta \epsilon$ denotes the dielectric anisotropy at 20° C., $\epsilon \|$ denotes the dielectric constant in the parallel direction to the molecular axis, and cp. denotes the clearing point [° C.].

EXAMPLE 1

The following polymerizable mixture is formulated

| | |
|---|---|
| Compound (1) | 32.67% |
| compound (2) | 18.67% |
| compound (3) | 21.00% |
| compound (4) | 21.00% |
| Dodecanol | 1.02% |
| BHT | 0.04% |
| Irgacure 907 | 5.60% |

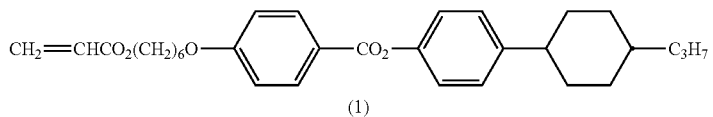

(1)

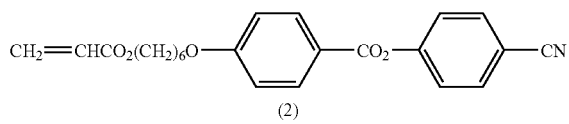

(2)

-continued

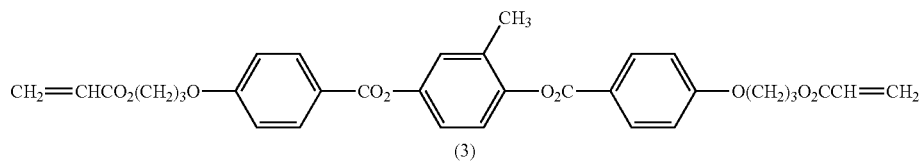

(3)

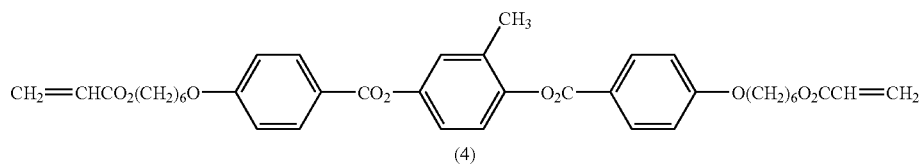

(4)

Compound (1) is described in WO 98/00428. Compound (2) can be prepared in anaolgy to the methods described in DE 195,04,224. Compounds (3) and (4) can be prepared in analogy to the methods described in WO 93/22397. Irgacure 907® is a photoinitiator commercially available from Ciba Geigy. BHT (butylated hydroxy toluene) is a commercially available stabilizer.

The mixture is coated as a thin layer onto a silica coated PET substrate and cured at 60° C. by irradiation with UV light to give a polymer film of 0.1 μm thickness with homeotropic orientation.

EXAMPLE 2

The following polymerizable mixture is formulated

| Compound (1) | 51.90% |
| compound (2) | 18.86% |
| compound (3) | 23.58% |
| Irgacure 907 | 5.66% |

A polymer film with homeotropic orientation is prepared as described in example 1 and is suitable as homeotropic alignment in liquid crystal displays.

EXAMPLE 3

To demonstrate the influence of the surface anchoring energy of an alignment layer of the present invention on the electrooptic properties of a liquid crystal display, computer simulations were carried out with an Autronic Melchers DIMOS system for a standard display cell of the vertically aligned (VA mode).

The VA cell has the following parameters: Two plane-parallel plates spaced apart at a distance of 4 μm and, on the inside of the plates, electrode layers covered with a homeotropic alignment layer of the present invention that can be prepared as described above. The cell contains the following nematic liquid crystal medium

| CCH-34 | 3.75% | cp. | 80 |
| CCP-21FF | 11.25% | Δn | 0.1002 |
| CCP-302FF | 13.50% | $n_e$ | 1.5825 |
| CCP-31FF | 11.00% | Δε | −4.4 |
| CCP-502FF | 14.00% | $ε_{\|}$ | 3.8 |

-continued

| PCH-301 | 14.75% |
| PCH-302FF | 13.00% |
| PCH-502FF | 12.75% |
| PGIGI-3-F | 6.00% | which is homeotropically aligned when no electric field is applied, and further contains a chiral dopant with a twist and a concentration such that a twist angle of 90° is induced in the medium when an electric field is applied.

The surface anchoring strength of the liquid crystal molecules at the cell wall induced by the alignment layer is expressed by the tilt anchoring parameter τ. A value of τ=0 means that the liquid crystal molecules are strongly anchored. A value of τ=1 means that the liquid crystal molecules are freely rotating, without being significantly anchored. The values of τ can be correlated to experimental data according to Mada et al., Jap. Journ. Appi. Phys. 38, L1118–L1120 (1999). Thus, a value of τ=1 (not anchored) corresponds to a surface anchoring energy of about $10^{-10}$ J/m², and a value of τ=0 (strongly anchored) corresponds to a surface anchoring energy of about $10^{-5}$ J/m².

FIGS. 1 to 4 show the electrooptic curve (transmission versus applied voltage) and the full steepness curve (numerical gradient of the electrooptical curve) of the above VA cell, wherein the LC medium is in contact with an alignment layer that has a given tilt anchoring parameter τ. The steepness is defined as $V_{90}/V_{10}$, wherein $V_{90}$ and $V_{10}$ are the voltages of the electrooptic curve at 90% and 10% of the maximum transmission, respectively.

FIGS. 1.1 and 1.2 show the electrooptic curve and full steepness curve, respectively, for the VA cell comprising an alignment layer with a tilt anchoring parameter of 0.

FIGS. 2.1 and 2.2 show the electrooptic curve and full steepness curve, respectively, for the VA cell comprising an alignment layer with a tilt anchoring parameter of 0.4.

FIGS. 3.1 and 3.2 show the electrooptic curve and full steepness curve, respectively, for the VA cell comprising an alignment layer with a tilt anchoring parameter of 1.

FIGS. 4.1 and 4.2 show the electrooptic curve and full steepness curve, respectively, for the VA cell comprising an alignment layer with a tilt anchoring parameter of (from left to right) 1, 0.8, 0.6, 0.4 and 0, respectively.

The results clearly demonstrate that there is a strong correlation between the surface anchoring energy of the vertically aligned liquid crystal molecules and the corresponding steepness of the electrooptical curve. The steepness of the electrooptical curve increases with decreasing surface anchoring energy, i.e. increasing value of τ.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. An alignment layer comprising a polymerized liquid crystal material with homeotropic orientation, in conjunction with a liquid crystal medium, whereby said layer functions to impart homeotropic alignment to said medium.

2. The alignment layer according to claim 1, having a the tilt angle in the polymerized liquid crystal material of 0 to 5° relative to the normal of the layer.

3. The alignment layer according to claim 1, wherein the liquid crystal material is polymerized in its nematic phase.

4. The alignment layer according to claim 1, wherein the liquid crystal material is polymerized in its smectic phase.

5. The alignment layer according to claim 1, wherein the liquid crystal material is polymerized in its smectic A phase.

6. The alignment layer according to claim 1, wherein the polymerized liquid crystal material forms a three-dimensional network.

7. The alignment layer according to claim 1, having it has a high surface anchoring energy.

8. The alignment layer according to claim 1, having a the tilt anchoring parameter τ of 0 to 0.6.

9. A process of preparing an alignment layer according to claim 1 comprising applying a layer of a polymerizable mesogenic or liquid crystal material onto a substrate, aligning the material into homeotropic orientation, polymerizing the material and optionally removing the polymerized film from the substrate.

10. The alignment layer according to claim 1, wherein the polymerized liquid crystal material is produced from a polymerizable liquid crystal material with a rod-shaped mesogen and at least one polymerizable group, and has a nematic or smectic phase.

11. The alignment layer according to claim 10, wherein the polymerizable liquid crystal material exhibits a smectic A phase.

12. The alignment layer according to claim 10, where the polymerizable liquid crystal material comprises one or more polymerizable mesogenic compounds of formula I $$P\text{-}Sp\text{-}X\text{-}MG\text{-}R \qquad I$$

wherein

P is a polymerizable group,

Sp is a spacer group or a single bond,

X —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CH—, —CF=CH—, —CH=CF—, —CF=CF—, —C≡C—, —CH=CH—COO—, —OCO—CH=CH— or a single bond, MG is a mesogenic group, R is H, F, Cl, Br, I, CN, SCN, SF$_5$H, NO$_2$, or a straight-chain or branched alkyl group with 1 to 20 C-atoms, which may be unsubstituted, mono- or poly-substituted by F, Cl, Br, I or CN, it being also possible for one or more non-adjacent CH$_2$ groups to be replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CH=CH— or —C≡C— in such a manner that O and/or S atoms are not linked directly to one another, or denotes P-Sp-X—, and R$^0$ and R$^{00}$ are independently of each other H or alkyl with 1 to 12 C-atoms.

13. The alignment layer according to claim 10, wherein the polymerizable liquid crystal material comprises
a) 25 to 80% of one or more monoreactive polymerizable mesogenic compounds having an unpolar terminal group,
b) 5 to 40% of one or more monoreactive polymerizable mesogenic compounds wherein polar terminal group,
c) 0 to 65% of one or more polymerizable mesogenic compounds having two or more polymerizable groups,
d) 0.01 to 5% of a photoinitiator.

14. The alignment layer according to claim 10, wherein the polymerizable liquid crystal material comprises 40 to 60% by weight of one or more compounds of formula I-1, 15 to 25% by weight of one or more compounds of formula I-2 and 15 to 60% by weight of one or more compounds of formula I-3

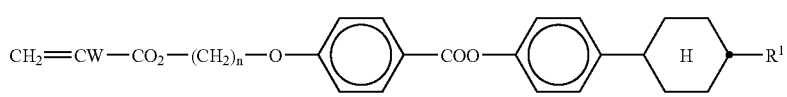

I-1

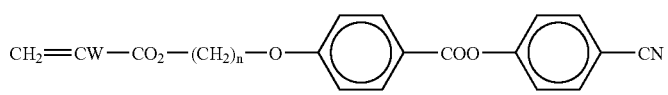

I-2

-continued

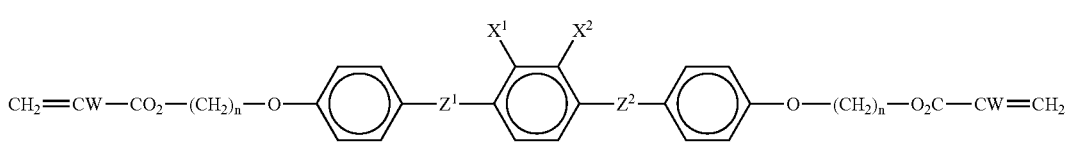
I-3 wherein
W is H or $CH_3$,
n is an integer from 3 to 6,
$Z^1$ and $Z^2$ are each independently —COO— or —OCO—,
$X^1$ and $X^2$ are each independently H or $CH_3$, and
$R^1$ is alkyl or alkoxy with 1 to 20 C atoms.

15. A method for generating homeotropic alignment in a liquid crystal, comprising applying an alignment layer according to claim 1.

16. Liquid crystal device comprising at least one alignment layer according to claim 1.

17. A liquid crystal device comprising at least one alignment layer according to claim 1 that is in contact with a liquid crystal medium and induces homeotropic alignment in the liquid crystal medium in the region of contact.

18. A liquid crystal device according to claim 16, comprising an additional nematic, smectic or cholesteric liquid crystal medium.

19. A liquid crystal device according to claim 16, which is a bistable or multistable liquid crystal display device.

20. A liquid crystal device according to claim 16, which is a display device of the VA (vertically aligned), VAN (vertically aligned nematic), VAC (vertically aligned cholesteric), ECB (electrically controlled birefringence), DAP (deformation of aligned phases), CSH (colour super homeotropic), hybrid alignment, HAN (hybrid aligned nematic), SSCT (surface stabilized cholesteric texture), PSCT (polymer stabilized cholesteric texture), flexoelectric or ULH (uniformly lying helix) mode, which can be of the transmissive, reflective or transflective type.

21. A liquid crystal display comprising
a liquid crystal cell comprising a liquid crystal medium provided between a first and a second electrode, at least one of which is light-transmissive, and wherein the liquid crystal molecules in said medium are oriented homeotropically when no external field is applied, and
an alignment layer according to claim 1, which is provided on the inner surface of at least one of said first and the second electrode such that it is directly in contact with the liquid crystal medium and induces homeotropic edge alignment in the liquid crystal medium.

22. A substrate, or alignment or auxiliary layer applied on a substrate, in anisotropic or liquid crystal polymer films with homeotropic structure prepared from polymerizable LC materials, wherein the substrate, or alignment or auxiliary layer is an alignment layer according to claim 1, and induces homeotropic orientation in the polymerizable LC material.

23. An anisotropic or liquid crystal polymer film with homeotropic structure, prepared from a polymerizable liquid crystal material on a homeotropic alignment layer according to claim 1.

24. A method of controlling the electrooptical steepness of a liquid crystal display of VA mode comprising at least one alignment layer according to claim 1, by varying surface anchoring energy of said alignment layer.

25. The alignment layer according to claim 1, having a surface anchoring energy of about $10^{-5}$ $J/m^2$.

* * * * *

UNITED STATES PATENT AND TRADEMARK OFFICE
CERTIFICATE OF CORRECTION

PATENT NO. : 7,105,209 B2  Page 1 of 1
APPLICATION NO. : 10/432682
DATED : September 12, 2006
INVENTOR(S) : Michael Heckmeier It is certified that error appears in the above-identified patent and that said Letters Patent is hereby corrected as shown below:

On The Title Page, Item (75), Inventors: lines 10-11, reads "South Gloucestershire" should read -- Alveston --
Title Page Item (73), Assignee: reads "KGaA," should read -- Patent GmbH, --
Column 23, line 21, reads "having a the" should read -- having a --
Column 23, line 33, reads "having it has" should read -- having --
Column 23, line 35, reads "having a the" should read -- having a --
Column 24, line 9, reads "X –O–," should read -- X is –O–, --
Column 24, line 32, reads "are independently of one another" should read -- are, independently of one another, --
Column 24, line 41, reads "wherein polar" should read -- having a polar --
Column 24, line 49, reads "I-2 and 15" should read -- I-2, and 15 --
Column 25, line 18, reads "crystal, comprising" should read -- crystal medium, comprising --
Column 26, line 26, reads "substrate, or alignment" should read -- substrate, alignment --

Signed and Sealed this

Third Day of July, 2007

JON W. DUDAS
*Director of the United States Patent and Trademark Office*